United States Patent [19]
Taylor et al.

[11] 3,811,278
[45] May 21, 1974

[54] FUEL INJECTION APPARATUS

[75] Inventors: Jack Rogers Taylor, Cincinnati; Thomas Loyd Du Bell, Maineville, both of Ohio

[73] Assignee: General Electric Company, Lynn, Mass.

[22] Filed: Feb. 1, 1973

[21] Appl. No.: 328,641

[52] U.S. Cl.............. 60/39.74 R, 239/402, 239/404
[51] Int. Cl. ............................................. F02c 7/22
[58] Field of Search.................... 60/39.74 R, 39.71; 239/400, 402–406

[56] References Cited
UNITED STATES PATENTS

| | | | |
|---|---|---|---|
| 3,703,259 | 11/1972 | Sturgess et al. ................ | 60/39.74 B |
| 3,605,405 | 9/1971 | Du Bell et al.................. | 60/39.74 R |
| 3,736,746 | 6/1973 | Du Bell et al.................. | 60/39.74 R |
| 3,667,221 | 6/1972 | Taylor.......................... | 60/39.74 R |

Primary Examiner—Carlton R. Croyle
Assistant Examiner—Robert E. Garrett
Attorney, Agent, or Firm—Edward S. Roman

[57] ABSTRACT

An improved fuel injection apparatus of the type employing a system of counter-rotating primary and secondary air swirl vanes is provided. Fuel from a low pressure source is first accelerated through an involute swirl passage by an inflow of high velocity pressurized air. The pre-swirled fuel-air mixture is then discharged into a centrifuging air stream where it is atomized and circumferentially dispersed in a uniform manner. An additional counter-rotating air stream in cooperation with the initial centrifuging air stream develops high shear stresses to further atomize and uniformly disperse the fuel-air mixture for burning in a combustion chamber.

8 Claims, 5 Drawing Figures

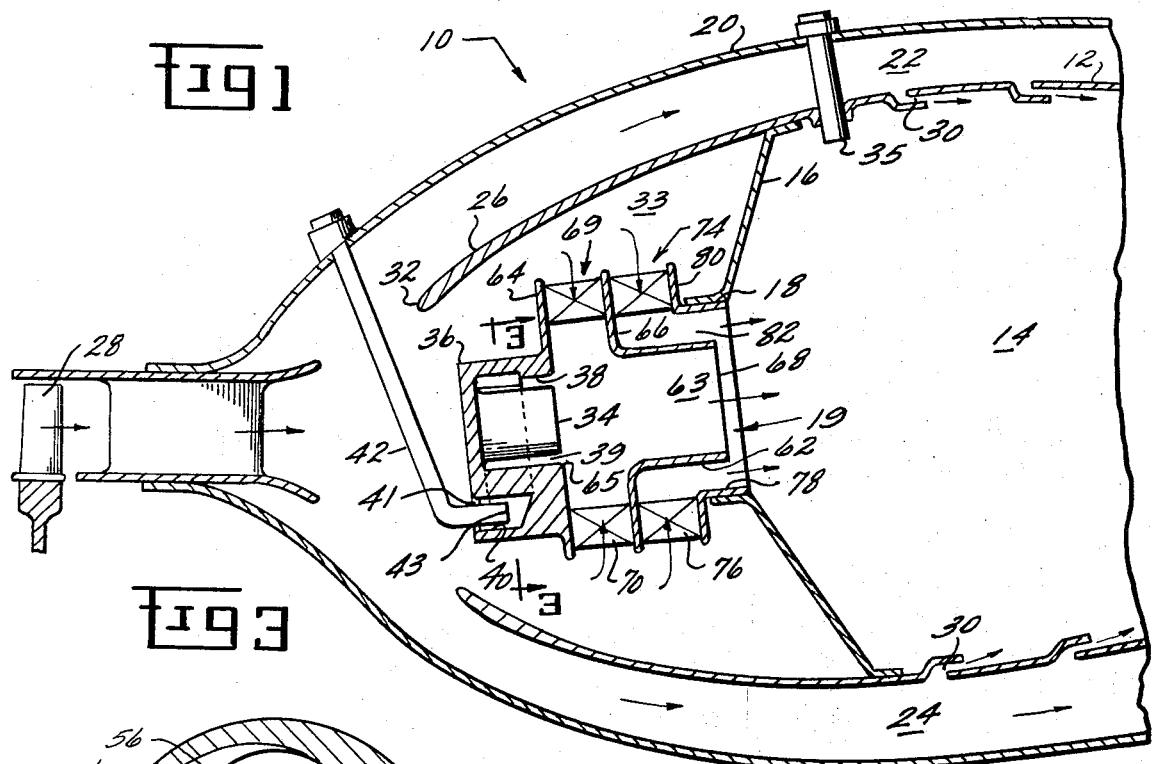

FUEL INJECTION APPARATUS

BACKGROUND OF THE INVENTION

This invention relates to an improved fuel injection apparatus and, more particularly, to an improved fuel injection apparatus for uniformly atomizing and dispersing fuel supplied to a combustion chamber.

Fuel injection into a continuous flow combustion chamber as, for example, in a gas turbine engine has posed continuing design problems. Difficulties have been encountered in injecting fuel in a highly dispersed manner so as to achieve complete and efficient combustion of the fuel, and at the same time minimize the occurrence of fuel rich pockets which, upon combustion, produce carbon or smoke. Fuel injection difficulties have been further complicated by the recent introduction of gas turbine engines having increased combustor pressure and inlet temperature capabilities. Existing fuel spray atomizer efficiency decreases as combustor pressure is increased, resulting in a more nonuniform dispersion of fuel, together with an increase in the fuel rich zones within the combustion chamber. Such zones cause reduced burner efficiency, excessive exhaust smoke, and a non-uniform heating of the combustor shell, a condition commonly referred to as hot streaking, which can lead to rapid deterioration of the shell.

Increasing the fuel pressure to spray atomizers has been suggested as one possible solution. However, the increased weight of a high pressure pump, together with the increased propensity of leaking the volatile high pressure fuel, imposed such a high risk as to make the use of high pressure pumps unlikely, at least within the immediate future.

A recently suggested atomizer for use with a low pressure fuel employs a system of counter-rotational primary and secondary swirl vanes. In this system a fuel-air mixture is introduced upstream of the swirl vanes and the fuel is subsequently atomized upon shearing of the liquid fuel droplets from the swirl vanes. However, such atomizers have been found on occasion to accumulate carbon between the swirl vanes when the inlet airflow to the atomizer is heated.

Therefore, it is a primary object of this invention to provide a fuel injection apparatus that will uniformly disperse a low pressure fuel in a highly atomized manner for introduction into a combustion apparatus.

It is also an object of this invention to provide a fuel injection apparatus employing a system of counter-rotating primary and secondary swirl vanes which are not subject to the accumulation of carbon between the swirl vanes even under heated inlet airflow conditions.

It is also an object of this invention to provide a fuel injection apparatus employing a system of counter-rotating primary and secondary swirl vanes wherein low pressure fuel is pre-mixed and pre-swirled by the inflow of pressurized air at a location upstream of the swirl vanes, thereby substantially eliminating the accumulation of carbon between the swirl vanes characteristic of conventional swirl type injectors.

SUMMARY OF THE INVENTION

The improved fuel injection apparatus of this invention includes a housing having an open ended generally cylindrical chamber therein. The cylindrical chamber is in flow communication with a fuel inlet port in the housing by means of an involute passage. A generally cylindrical centerbody of smaller diameter than the cylindrical chamber is disposed concentric to the chamber so as to define an annular passage therebetween. A generally cylindrical primary shroud is coaxially spaced apart from the open end of the cylindrical chamber to define a central core air passage.

Primary air swirl means are disposed intermediate the housing and primary shroud to impart a circumferential swirl component to the flow through the core. Secondary air swirl means are disposed downstream of the primary swirl means to impart a circumferential swirl component in the direction opposing that of the primary swirl means. Liquid fuel reaching the downstream end of the primary shroud becomes atomized by the shear stresses developed by the counter-rotating aerodynamic forces at the confluence of the primary and secondary swirls.

BRIEF DESCRIPTION OF THE DRAWINGS

The invention may be better understood upon reading the following description of the preferred embodiment in conjunction with the accompanying drawings.

FIG. 1 shows a partial cross-sectional view of a typical combustion chamber of the type suitable for a gas turbine engine and including the fuel injection apparatus of this invention.

FIG. 2 is a cross-sectional view in perspective of the fuel injection apparatus shown in FIG. 1.

FIG. 3 is a cross-sectional view taken along the line 3—3 of FIG. 1.

DESCRIPTION OF THE PREFERRED EMBODIMENT

Figure 4:
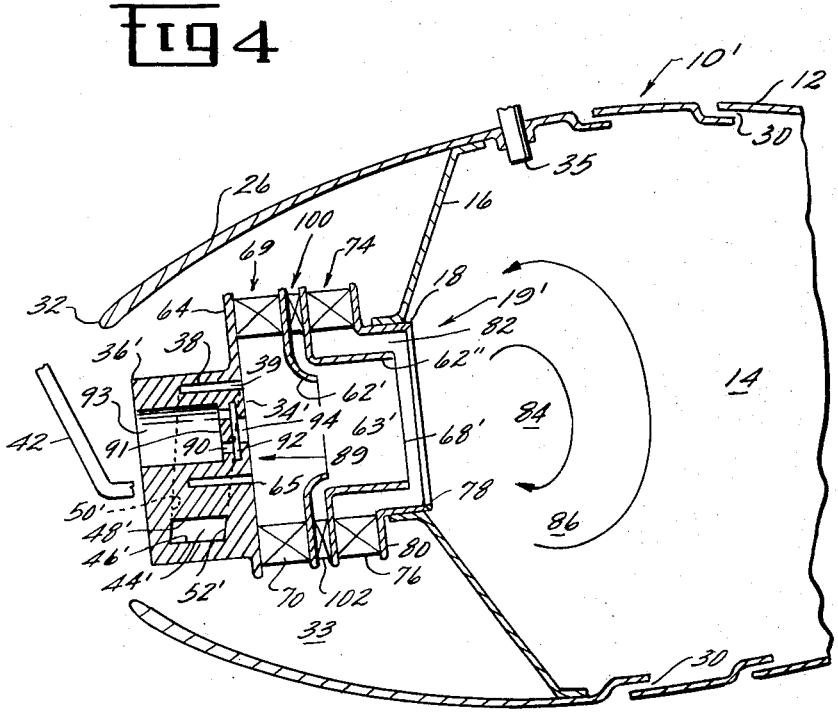
FIG. 4 is a partial cross-sectional view of the combustion chamber of FIG. 1 including an alternate embodiment for the fuel injection apparatus of this invention.

Referring now to the drawings, and particularly to FIG. 1, a continuous burning combustion apparatus of the type suitable for use in a gas turbine engine has been shown generally at 10 as comprising a hollow body 12 defining a combustion chamber 14 therein. The hollow body 12 includes a domed transverse upstream closure member 16 having a plurality of circumferentially spaced apart openings 18 of which only one is shown in the drawing. Each opening 18 receives an improved fuel injection apparatus 19 of this invention. The domed upstream closure member 16 and the improved fuel injection apparatus 19 define the upstream end of the chamber 14, with the domed member 16 suitably secured to the hollow body 12. Domed member 16 may also include a plurality of louvers therethrough which are not shown. As will be understood by those skilled in the art, the combustion chamber 14 may be of the annular type or the canular type.

An outer shell 20 may be provided to close the hollow body 12 and define passages 22 and 24 in cooperation with the hollow body 12 and an upstream extension 26 of the hollow body 12. As will be understood, the passages 22 and 24 are adapted to deliver a flow of pressurized air from a suitable source, such as a compressor 28, into the combustion chamber 14 through suitable apertures or louvers 30 for cooling of the hollow body 12 and dilution of the gaseous products of combustion as is well known in the art. The upstream extension 26 of the hollow body 12 is adapted to function as a flow splitter to divide the pressurized air delivered from the compressor 28 between passages 22, 24 and an upstream end opening 32 of the extension 26. The opening 32 communicates with a chamber 33 which is defined internally of the extension 26 and the domed member 16.

Referring now to FIGS. 2 and 3, the improved fuel injection apparatus of this invention has been shown generally at 19 as comprising a housing 36 having an axially aligned cylindrical opening 38 therein. A cylindrical centerbody or plug 34 of smaller diameter than the cylindrical opening 38 is disposed concentrically within the opening 38 so as to define an annular air passage 39 therebetween. The cylindrical centerbody 34 may be formed integral with the housing 36 or may be attached thereto by suitable means. The housing 36 further includes a fuel inlet port 40 for receiving fuel from the discharge end 43 of a fuel delivery conduit 42. The fuel delivery conduit 42 communicates with a source of low pressure fuel (not shown) so as to provide fuel to the injection apparatus of this invention. While the fuel injection apparatus 19 is particularly adapted for use with low pressure liquid fuel and will be hereinafter described in connection with a low pressure liquid fuel, it will be understood that fuel in the liquid state, gaseous state, or combination thereof may be effectively used. Also high pressure fuel could also be utilized with equal effectiveness.

As is readily apparent from FIG. 2, the discharge end 43 of the fuel delivery conduit 42 is of smaller diameter than the inlet port 40 so as to be only loosely fitted therein and define an annular air inlet 41 which permits a portion of the high velocity compressor 28 discharge air to enter the inlet port 40 and accelerate the generally low pressure fuel discharged from conduit 42. An involute or spiral air passage 44 interconnects the fuel inlet port 40 with the cylindrical opening 38. Spiral air passage 44 is defined by an outer involute wall 46 spaced apart from an inner involute wall 48, both of which progress with decreasing radius from the fuel inlet port 40 to the cylindrical opening 38. The axial limits of the involute air passage 44 are defined by two generally planar, spaced apart upstream and downstream end walls, 50 and 52, which are peripherally joined to the outer and inner involute walls 46 and 48. The involute air passage 44 communicates with the fuel inlet port 40 through a generally radially facing inlet opening 54 with flow communication from the other end of the involute air passage 44 to the cylindrical opening 38 made through a generally circumferentially extending outlet opening 56. The circumferentially extending outlet opening 56 is defined by the tangential intersection of the involute outer wall 46 with the interior surface of the cylindrical opening 38 and by the keen edge 60 formed by the near tangential intersection of the involute inner wall 48 with the interior surface of the cylindrical opening.

A generally cylindrical primary shroud member 62 is co-axially spaced apart from the housing 36 so as to define a cylindrical core air passage 63 therethrough. Primary air swirl means shown generally at 69 are provided by a plurality of circumferentially spaced swirl vanes 70. The swirl vanes 70 are maintained in circumferentially spaced relation by disposition between a first radially extending circumferential wall member 64 formed integral to the housing 36, and a second radially extending circumferential wall member 66 formed integral with the forward end of the primary shroud 62. The primary air swirl means 69 imparts a swirl component to the radial inflow of air from the chamber 33 wherein the air swirl is in the same circumferential direction as that of decreasing radius for the spiral passage. Air from the primary swirl means 69 is injected radially inward relative to the annular air passage 39 to provide a centrifuging effect on the fuel-air mixture emanating from passage 39. The primary shroud 62 terminates in a generally transverse circumferential edge 68 so as to define the core outlet.

Secondary air swirl means 74 are provided by a plurality of circumferentially spaced swirl vanes 76 in order to impart a counter-rotating swirl to the radial inflow of air from the chamber 33. The secondary swirl is in the circumferential direction opposing that of the primary swirl. A generally cylindrical secondary shroud 78 of larger diameter than the primary shroud 62 circumscribes the primary shroud in general co-axial alignment therewith, so as to define an annular secondary core 82. The swirl vanes 76 are maintained in circumferentially spaced relation by disposition between the second circumferential wall member 66 and a third radially extending circumferential wall member 80 formed integral with the forward end of the secondary shroud 78.

In operation, liquid fuel is delivered to the discharge end 43 of the fuel delivery conduit 42. Low pressure fuel discharging from the conduit 42 into the fuel inlet port 40 is accelerated by a portion of the high velocity compressor 28 discharge air entering through the annular air inlet 41. The fuel is accelerated and pushed by the high velocity air into the spiral air passage 44 where it is directed in a generally counter-clockwise direction as referenced from the aft side of the fuel injection apparatus. The liquid fuel circulating within the spiral air passage 44 is carried by the air in a swirling flow along the involute outer wall 46 by the swirling air flow and is subsequently discharged into the primary annulus 39 as a swirling flow. While flowing along the involute outer wall 46, a portion of the fuel may be evaporated from the surface of the spiral air passage 44 by the compressor discharge air and by radiant heat from the flames within the combustion chamber 14. For the most part, however, the swirling flow of fuel films the interior surface of the cylindrical opening 38 and travels downstream in a liquid stream.

A circumferential edge 65 defined by the intersection of the cylindrical opening 38 with the circumferential wall 64 defines the downstream limit of the cylindrical opening 38. Fuel reaching the circumferential edge 65 is sheared therefrom and centrifuged within the core air passage 63 by the primary vortical flow 84 emanating from the primary swirl means 69. As should be readily apparent from the above description and drawings, the primary vortical flow 84 is in the same circumferential direction as that of the fuel flow reaching the circumferential edge 65, and enhances the rotational velocity previously imparted to the fuel by the spiral air passage 44.

Although the exact dispersion of fuel within the core air passage 63 is very often difficult to predict with great precision, it is believed that a portion of the liquid fuel sheared from the circumferential edge 65 is vaporized and/or atomized by entrainment within the primary vortical flow 84. That portion of the liquid fuel not vaporized and/or atomized is centrifuged radially outward by the primary vortical flow into direct impingement on the interior surface of the primary shroud 62. The impinging fuel forms a swirling film of liquid fuel on the interior surface of the primary shroud which travels axially downstream in the direction of the transverse circumferential edge 68 of the primary shroud 62.

A secondary counter-rotating vortical flow 86 emanates from the secondary swirl means 74 in a clockwise direction as referenced from a point downstream of the fuel injection apparatus 19. Fuel reaching the transverse circumferential edge 68 of the primary shroud 62 is highly atomized by the high aerodynamic shear stresses developed at the confluence of the counter-rotating primary and secondary vortical flows. A conical area of turbulent airflow exists on the boundary 88 between the primary and secondary vortical flows which acts to even further disperse the atomized fuel droplets. It should be readily appreciated that the above described clockwise and counter-clockwise directions have been only arbitrarily established and could be respectively reversed.

It is believed that the majority of atomized fuel droplets are centrifuged into the secondary vortical flow 86 where they are driven generally outward toward the hollow body 12. The high differential velocity component between the counter-rotating vortical flows permits a high relative velocity component for the fuel droplets without having to accelerate the fuel droplets to such a high absolute velocity.

As will be understood, a suitable igniter 35 is provided within the combustion chamber 14 to provide initial ignition of the combustible air/fuel mixture discharged by the fuel injection apparatus 19.

The core of the primary vortical flow 84 is at a reduced pressure, thereby entraining a portion of the hot products of combustion and causing a recirculation thereof so as to maintain continuous ignition within the combustion chamber 14.

The primary advantage to the fuel injection apparatus 19 of this invention is attributable to the fact that liquid fuel need not travel through a plurality of closely spaced swirl vanes so as to precipitate the accumulation of carbon therebetween. Improved atomization and dispersion of the fuel is further provided by three distinct atomizing and dispersing mechanisms of the fuel injection apparatus of this invention. The first atomizing and dispersing mechanism is provided by the spiral air passage 44 in cooperation with the fuel inlet port 54 which introduces a portion of the high velocity compressor discharge air into the spiral passage. The second atomizing and primary dispersing mechanism is provided by the primary vortical flow which shears liquid fuel from the edge 65 of the cylindrical air passage 38 and centrifuges the fuel within the core 63 atomizing and dispersing a portion of the fuel so entrained. The third dispersing and primary atomizing mechanism is provided by the confluence of the counter-rotating primary and secondary vortical flows which shear liquid fuel reaching the transverse edge 68 of the primary shroud 62 and disperse the fuel droplets within the conical area of turbulent airflow between the primary and secondary vortical flows.

Figure 5:
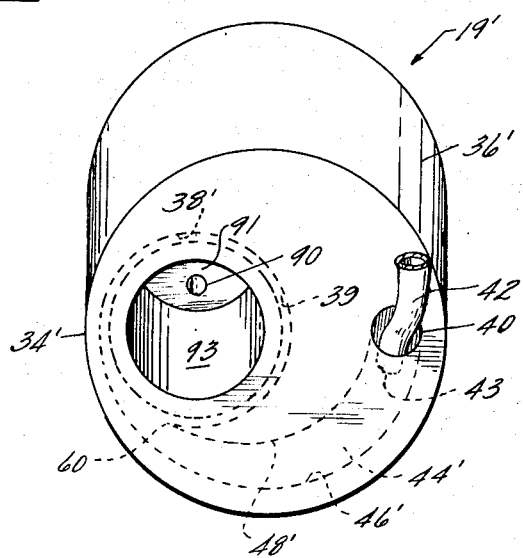
FIG. 5 is a partial perspective view of the forward end of the fuel injection apparatus of FIG. 4.

Referring now to FIGS. 4 and 5, where like numerals designate previously described elements, there is shown an alternate embodiment of the fuel injection apparatus of this invention. In order to prevent carbon accumulation on the downstream face of the cylindrical centerbody 34', anti-carbon means shown generally at 89 are provided. The anti-carbon means 89 are of the same type as fully disclosed in U.S. Pat. No. 3,605,405 of common assignment, and include a plurality of small holes 90 appropriately spaced circumferentially around a flat wall 91 and communicating for receipt of compressor discharge air through a hollow cylindrical air passage 93. Compressor discharge air flowing through the holes 90 enters an interior chamber 92. The air then exits from the downstream end of the centerbody 34 through a central opening 94 so as to purge the downstream end of the centerbody. The holes 90 are positioned to prevent direct axial flow between the holes 90 and the central opening 94 and are preferably inclined so that the purge air is swirled into the air passage 92 prior to exiting through the opening 94. The holes 90 are preferably inclined in a direction to provide swirling motion in the same direction as the primary vortical flow. Although particular reference has been made to this type of anti-carbon means, it is to be readily understood that alternate types of anti-carbon means could be utilized with equal success.

It may be preferred that the spiral passage be flaired as is shown at 44', while still maintaining a near constant cross-sectional area. As is readily observed by reference to FIG. 5, the involute outer wall 46' has a more rapidly decreasing radius than that of the involute inner wall 48'. Therefore, in order to maintain the near constant cross-sectional area throughout the entire length of the flaired spiral air passage 44', it becomes necessary to have the upstream and downstream end walls, shown outlined in FIG. 4 by phantom lines 50', 52' respectively, axially diverge from each other upon decreasing radius. The flaired spiral passage 44' spreads the liquid fuel in an axial direction maintaining a thin and uniform distribution of fuel over the interior surface of the cylindrical passage 38, improving the degree of atomization therefrom.

It has been found that increasing the axial length of the primary shroud 62 precipitates an increase in the amount of carbon which tends to accumulate on the interior surface of the shroud. In order to maintain this surface free from carbon accumulation, it may be necessary to introduce additional swirling purge air through a third air swirl means 100. Swirl means 100 are shown as including a plurality of circumferentially spaced swirl vanes 102 arranged to impart a swirl to the radial inflow of air from the chamber 33 in the same circumferential direction as that of the primary vortical flow 84 emanating from the primary swirl means 69. The swirl vanes 100 are retained by means of two coaxially spaced partitions 62', 62'', which cooperate together to form what can be generally termed "a radially divided primary sroud." The primary shroud partitions 62',62'' enclose a cylindrical core passage 63' which together function in the manner previously described in order to effect an efficient atomization of the fuel swirled therethrough with the only difference being the additional swirling purge air which emanates from the swirl means 100. As is readily obvious from FIG. 4, the swirl vanes 102 are made axially narrower in comparison to the primary and secondary swirl vanes 70, 76 and only admit a small fraction of air in comparison with the other swirl vanes.

It is to be understood that should the primary shroud be axially extended even further, additional swirling purge air could be supplied by any number of individual swirl means coaxially stacked in the manner of FIG. 4. Accordingly, while preferred embodiments of the present invention have been depicted and described, it will be appreciated by those skilled in the art that many modifications, substitutions and changes may be made thereto without departing from the invention's fundamental theme.

What is claimed is:

1. A fuel injection apparatus comprising:
   a housing having generally cylindrical chamber therein in flow communication with a fuel inlet port by means of an involute passage, said cylindrical chamber being open at one end
   a generally cylindrical centerbody of smaller diameter than the cylindrical chamber disposed concentric to the chamber so as to define an annular air passage therebetween,
   a generally cylindrical primary shroud coaxially spaced apart from the open end of the cylindrical chamber defining a central core air passage,
   primary air swirl means disposed intermediate the housing and primary shroud to impart a circumferential swirl component to the flow through the core, and
   secondary air swirl means disposed downstream of the primary swirl means to impart a circumferential swirl component in the direction opposing that of the primary swirl means such that fuel reaching the downstream end of the primary shroud is atomized by the shear stresses developed by the counter-rotating aerodynamic forces at the confluence of the primary and secondary swirls.

2. The fuel injection apparatus of claim 1 including:

a fuel delivery conduit having a discharge end disposed in flow communication with the fuel inlet port wherein the discharge end of the conduit and inlet port are cooperatively arranged to permit the entrance of a high velocity air flow which acts to push the fuel through the involute passage to the annular air passage.

3. The fuel injection apparatus of claim 2 wherein:
   the discharge end of the fuel delivery conduit is interposed within the fuel inlet port and spaced apart therefrom to define an air passage therebetween for receipt of the high velocity air.

4. The fuel injection apparatus of claim 2 wherein:
   the involute passage is defined by an outer involute wall spaced apart from an inner involute wall, both of which progress with decreasing radius from the fuel inlet port to the cylindrical chamber with the axial limits of the involute passage defined by two generally planar, spaced apart end walls which are peripherally joined to the outer and inner involute walls.

5. The fuel injection apparatus of claim 4 wherein:
   the involute passage is flaired in a manner which maintains a substantially constant cross-sectional area throughout the length thereof, such that the radius of the outer involute wall decreases more rapidly than the radius of the inner involute wall and the end walls diverge along the decreasing radius of the involute passage.

6. The fuel injection apparatus of claim 2 wherein means for purging the downstream end of the cylindrical centerbody from carbon accumulation thereon include:
   a flat transverse partition internal to the centerbody and having a plurality of small holes circumferentially spaced therearound for receiving an outside airflow through a central passage,
   an internal chamber adjacent the flat partition for receiving airflow from the small holes and directing such airflow through a central opening at the downstream end of the centerbody thereby purging the end of the centerbody from carbon accumulation.

7. The fuel injection apparatus of claim 2 wherein:
   the primary air swirl means includes a first plurality of circumferentially spaced swirl vanes disposed intermediate a first radially extending circumferential wall member formed integral to the housing and a second axially spaced apart radially extending circumferential wall member formed integral to the primary shroud wherein the swirl vanes are arranged to impart a circumferential swirl velocity in the same direction as that of decreasing radius for the involute passage,
   and the secondary air swirl means includes a second plurality of circumferentially spaced swirl vanes disposed intermediate the second wall member and a third axially spaced apart radially extending circumferential wall member.

8. The fuel injection apparatus of claim 7 including:

means for purging the interior surface of the primary shroud from the accumulation of carbon wherein the purge means include at least one additional air swirl means disposed between the primary and secondary swirl means and in flow communication with the core for imparting a swirl component to the flow therethrough in the same circumferential direction as that imparted by the primary swirl means.

\* \* \* \* \*